Dec. 14, 1948.  R. W. TADD  2,456,157
PROTECTOR FOR THE DOORS OF VEHICLES
Filed Sept. 6, 1947
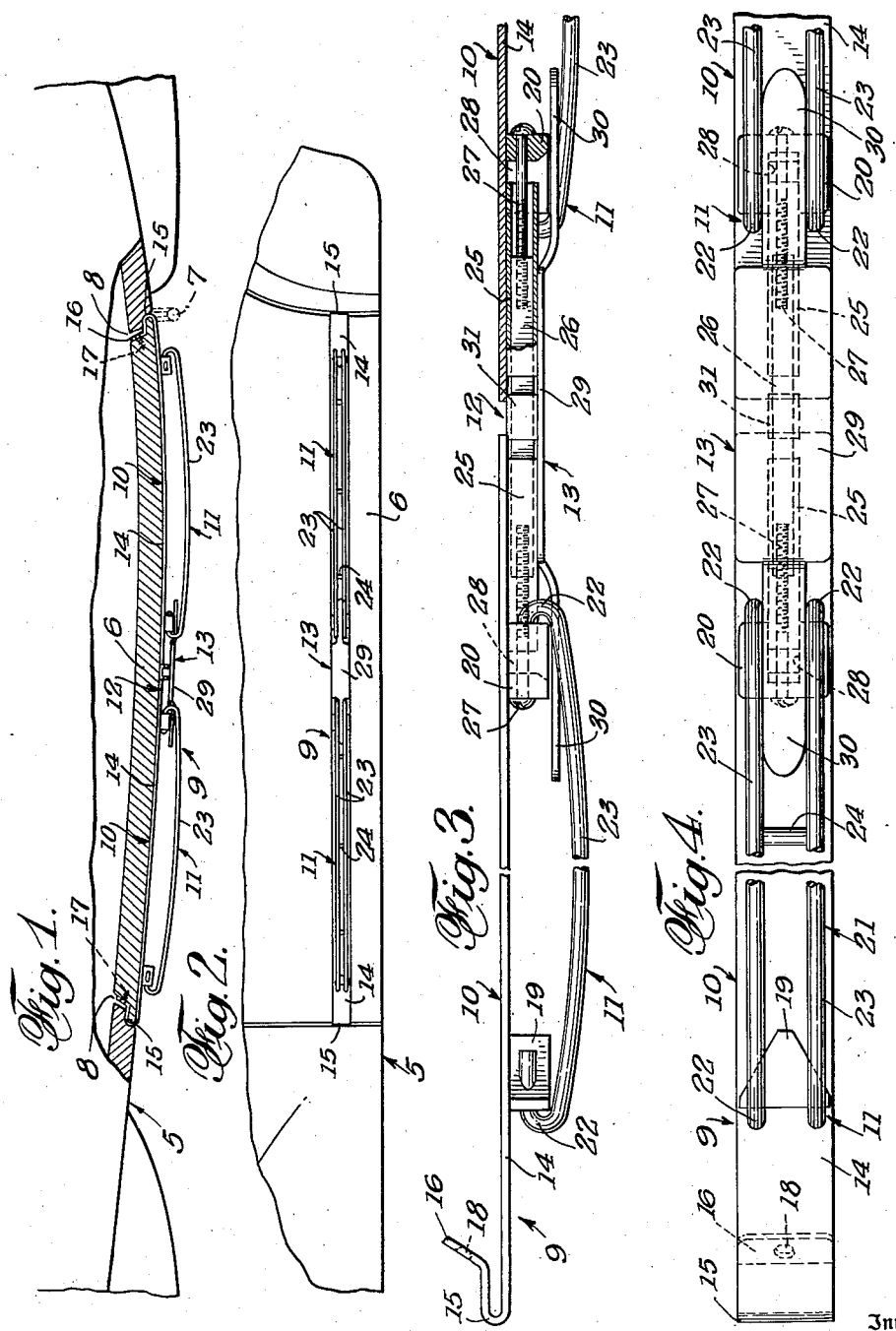
Inventor
ROY W. TADD
By C. G. Stratton
Attorney Patented Dec. 14, 1948

2,456,157

UNITED STATES PATENT OFFICE 2,456,157

PROTECTOR FOR THE DOORS OF VEHICLES

Roy W. Tadd, San Gabriel, Calif.

Application September 6, 1947, Serial No. 772,527

8 Claims. (Cl. 293—62)

This invention relates to means for protecting the doors of vehicles from marring and/or injury and deals more particularly with a bumper applicable to a vehicle door. Modern automotive vehicles are made without running boards or having the doors overstanding the same. Such running boards, in the past, comprised means which took the shock of collisions and thereby materially reduced expensive body repairs. Modern vehicle doors are exposed to such damage and it is the primary object of the present invention to provide simple, effective and readily applicable bumper means that protect the doors from the bumpers of other vehicles.

Another object of the invention is to provide an improved bumper, of the character indicated, which is readily affixed to a door and moves therewith and is adjustable for different sizes of doors.

Another object of the invention is to provide an adjustable bumper in which the fastening means is concealed to present a trim and neat device.

A further object of the invention is to provide a bumper for protecting doors that is resilient to absorb shock.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a partial plan view of an automotive vehicle, with a door thereof in plan section, and showing a protecting bumper applied to said door.

Fig. 2 is a side elevational view thereof.

Fig. 3 is an enlarged broken plan view, partly in section, of the door bumper.

Fig. 4 is a side elevational view thereof.

As shown in the drawing, a conventional vehicle body 5 is provided with a door 6 that is hinged as at 7 to fit the body as at jambs 8.

According to the invention, the door 6, typical of all the doors of the vehicle, is fitted with a protecting bumper 9 applied at such a level that the same receives collision shocks from the front and rear bumpers of other vehicles.

The bumper 9 comprises, generally, similar right and left-hand sections 10 each provided with a resilient bumper portion 11, means 12 for adjustably connecting the sections to span across the door, and means 13 for concealing the latter means whereby the bumper presents a trim and neat appearance.

Each section 10 comprises a strap or band 14 that is formed with an end loop or hook 15 for hooking engagement with a lateral edge of the door. Each hook 15 is formed with an inwardly directed end 16 that is designed to engage the door edge face and to be secured thereto as by screws or the like 17 passing through suitable holes 18 in said ends 16. Thus, each band 14 is fastened to the door without the need for marring the same with drilled holes that are visible from the outside.

A bumper portion 11 is carried by each band 14 and comprises spaced and fixed blocks 19 and 20 adjacent opposite ends of the bands, and a resilient bumper unit 21 having its ends 22 hooked into each block 19 and 20 and outwardly bowed in spaced coextensive relation to band 14 substantially as illustrated. Each unit 21 consists of longitudinal rods 23 and one or more spacing and connecting elements 24 whereby said units are light yet sturdy for the purpose of receiving and absorbing shocks.

The means 12 comprises a tubular member 25 affixed to the inner end of each band 14, a bar 26 telescopically fitted through the tubular members 25 of both bands, and a bolt 27 extending through each block 20 and threadedly engaged with said bar 26. Each block 20 is formed with a bifurcation 28 for the opposite ends of tubular members 25 to thereby shorten the effective length of means 12. In practice, the adjacent ends of the bands 14 are spaced apart, as shown, and said bands are connected in tension by bolts 27 and bar 25.

The means 13 comprises a plate 29 that extends across the gap between the bands and has reduced ends 30 that extend between the rods 23 of each bumper unit 21 so that said ends have overstanding relation to the tubular members 25 and blocks 20 of both sections, substantially as shown. The plate 29 has a tube 31 fixed thereon for sliding engagement with bar 25 and is thereby held in place to effect the concealment of the fastening means 12.

While in practice, the bumper units 21 are initially bowed to have desired resiliency, the bands 14 may be formed straight and flat and be readily curved to suit the transverse curvature of the door to which applied.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A protector for the door of a vehicle, comprising similar sections having hooking engagement with opposite lateral edges of said door, means for connecting the sections, and a bumper unit carried by each section.

2. A protector for the door of a vehicle, comprising similar sections having hooking engagement with opposite lateral edges of said door, an inner extension on one end of each section adapted to engage the opposite lateral edge faces of said door, means for connecting the sections, and a bumper unit carried by each section.

3. A protector for the door of a vehicle, comprising similar sections having hooking engagement with opposite lateral edges of said door, an inner extension on one end of each section adapted to engage the opposite lateral edge faces of said door, fastening screws for said sections passing through said extensions and into the door edge faces, means for connecting the sections, and a bumper unit carried by each section.

4. A protector for the door of a vehicle, comprising similar sections having hooking engagement with opposite lateral edges of said door, means for connecting the sections comprising tubular members, one on each section, a bar extending through the tubular members, a block on the inner end of each tubular member, screw means interconnecting said bar and blocks, and a bumper unit carried by each section.

5. A protector for the door of a vehicle, comprising similar sections having hooking engagement with opposite lateral edges of said door, means for connecting the sections, and a bumper unit carried by each section, and comprising a resilient frame having its ends anchored to its respective section and outwardly bowed between the ends.

6. A protector for the door of a vehicle, comprising similar sections having hooking engagement with opposite lateral edges of said door, means for connecting the sections, a bumper unit carried by each section, and means having overstanding relation to the section-connecting means to conceal the latter.

7. A protector for the door of a vehicle, comprising similar sections having hooking engagement with opposite lateral edges of said door, a pair of longitudinally spaced blocks mounted on each section, a resilient bumper unit spanning between each pair of blocks, and means adjustably interconnecting the sections.

8. A protector for the door of a vehicle, comprising similar sections having hooking engagement with opposite lateral edges of said door, a pair of longitudinally spaced blocks mounted on each section, a resilient bumper unit spanning between each pair of blocks, means adjustably interconnecting the sections, and means carried by the connecting means having overstanding relation therewith to conceal the same.

ROY W. TADD.

REFERENCES CITED

The following references are of record in the file of this patent:

UNITED STATES PATENTS

| Number | Name | Date |
|---|---|---|
| 1,513,257 | McGowen | Oct. 28, 1934 |
| 1,776,952 | Pimm | Sept. 30, 1931 |
| 2,111,814 | Schulman | Mar. 22, 1938 |

FOREIGN PATENTS

| Number | Country | Date |
|---|---|---|
| 511,441 | Germany | July 21, 1929 |